(12) United States Patent
 Donahue

(10) Patent No.: US 11,067,737 B2
(45) Date of Patent: Jul. 20, 2021

(54) PIXEL CONFIGURATION AND SURFACE TREATMENT IN A TRANSPARENT DISPLAY

(71) Applicant: NanoPath, Inc., Leominster, MA (US)

(72) Inventor: Kevin Donahue, Harvard, MA (US)

(73) Assignee: NANOPATH, INC., Leominster, MA (US)

( * ) Notice: Subject to any disclaimer, the term of this patent is extended or adjusted under 35 U.S.C. 154(b) by 0 days.

(21) Appl. No.: 16/374,429

(22) Filed: Apr. 3, 2019

(65) Prior Publication Data

US 2019/0310412 A1    Oct. 10, 2019

Related U.S. Application Data

(60) Provisional application No. 62/652,383, filed on Apr. 4, 2018.

(51) Int. Cl.
 *F21V 8/00* (2006.01)
(52) U.S. Cl.
 CPC ......... *G02B 6/0065* (2013.01); *G02B 6/0051* (2013.01); *G02B 6/0055* (2013.01); *G02B 6/0058* (2013.01)
(58) Field of Classification Search
 None
 See application file for complete search history.

(56) References Cited

U.S. PATENT DOCUMENTS

| | | | |
|---|---|---|---|
| 2007/0280593 A1* | 12/2007 | Brychell | G02B 6/0061 385/31 |
| 2008/0285307 A1* | 11/2008 | Aylward | G02B 6/0061 362/618 |
| 2010/0061115 A1 | 3/2010 | Donahue | |
| 2012/0188791 A1* | 7/2012 | Voloschenko | G02F 1/133606 362/606 |
| 2014/0146563 A1 | 5/2014 | Watanabe et al. | |
| 2014/0369072 A1 | 12/2014 | Liao et al. | |
| 2017/0168211 A1 | 6/2017 | Donahue | |

FOREIGN PATENT DOCUMENTS

| | | |
|---|---|---|
| EP | 1 992 869 A2 | 11/2008 |
| WO | WO-2007/137253 A2 | 11/2007 |

OTHER PUBLICATIONS

International Search Report and Written Opinion of the International Searching Authority on PCT/US2019/025598 dated Jul. 22, 2019.

* cited by examiner

*Primary Examiner* — Ashok Patel
(74) *Attorney, Agent, or Firm* — Foley & Lardner LLP

(57) ABSTRACT

A one-way see-through illumination device includes a light guide, a light source at an edge of the light guide and a pattern of pixels on a surface of the light guide. The light guide has an illumination surface and a non-illumination surface opposite to the illumination surface. The light source is configured to inject light into the edge of the light guide. The pattern of pixels and the light guide are arranged to generate transparent illumination by the frustration of total internal reflection of light injected into the light guide such that light from the light source is emitted through the illumination surface. The pixels are arranged to prevent the generation of a diffraction grating in the light guide.

10 Claims, 4 Drawing Sheets

PIXEL CONFIGURATION AND SURFACE TREATMENT IN A TRANSPARENT DISPLAY

RELATED APPLICATIONS

This application claims priority to U.S. Provisional Application Ser. No. 62/652,383 filed Apr. 4, 2018, entitled "PIXEL CONFIGURATION AND SURFACE TREATMENT IN A TRANSPARENT DISPLAY," incorporated by reference herein in its entirety.

FIELD OF DISCLOSURE

Systems and methods for displays are described using pixel placement.

BACKGROUND

One-way see-through illumination, also called transparent illumination, may be used in planar light guides including: eyeglass lenses, signs and windows. For example, U.S. Pat. Nos. 8,511,884, 7,513,674 and 8,100,575 describe various implementations for rendering one-way see-through illumination.

In the above identified patents, pixels that emit light in one direction are applied to the surface of an active light guide. These pixels are composed of a layer of light diffusing material that is capped by a metallic reflector. The light diffusing layer in each pixel emits light by frustrating total internal reflection. Each pixel's metallic cap then prevents light from being emitted through the non-illuminated side of the light guide causing transparent illumination. Ultimately, to achieve a fully transparent illumination (meaning no trace of illumination or pixel structures on the non-illuminated side of the light guide), microscopic/invisible pixels are required to prevent the perception of a pixel pattern especially in applications such as eyeglasses. For example, in an eyeglass application of transparent illumination in which the exterior of each eyeglass lens is illuminated, pixels greater than 15 microns in width can be perceived by the human eye, thus distorting or impeding vision. Thus, to promote "invisible" transparent illumination, invisible pixels, i.e. pixels less than 15 microns in width, are deployed. Arrays of micron scale pixels, however, regardless of their geometric shape, often cause diffraction gratings. These diffraction gratings separate composite/ambient light into its components causing a rainbow effect that distorts vision when viewing an object through a transparent display.

SUMMARY

According to inventive concepts disclosed herein, there is provided a one-way see-through illumination device. The device comprises a light guide, a light source at an edge of the light guide and a pattern of pixels on a surface of the light guide. The light guide has an illumination surface and a non-illumination surface opposite to the illumination surface. The light source is configured to inject light into the edge of the light guide. The pattern of pixels and the light guide are arranged to generate transparent illumination by the frustration of total internal reflection of light injected into the light guide such that light from the light source is emitted through the illumination surface. The pixels are arranged to prevent the generation of a diffraction grating in the light guide.

According to one aspect according to inventive concepts disclosed herein, the pixels have a width less than one micron.

According to one aspect according to inventive concepts disclosed herein, the pixels are disposed in a non-uniform manner.

According to one aspect according to inventive concepts disclosed herein, the pixels have a width less than one micron.

According to one aspect according to inventive concepts disclosed herein, the pixels have various different widths.

According to one aspect according to inventive concepts disclosed herein, the pixels have various different depths.

According to one aspect according to inventive concepts disclosed herein, the pixels have various spacings between pixels.

According to one aspect according to inventive concepts disclosed herein, the pixels have various pixel shapes.

According to one aspect according to inventive concepts disclosed herein, the pixels have various pixel densities.

According to one aspect according to inventive concepts disclosed herein, the pixels include a light diffusing layer and a light reflecting layer.

According to one aspect according to inventive concepts disclosed herein, the pattern of pixels comprises a maximum pixel width of less than 15 microns.

According to inventive concepts disclosed herein, there is provided a one-way see-through illumination device. The device comprises a light guide, a light source at an edge of the light guide, a pattern of pixels on a surface of the light guide, and an antireflection coating. The light guide has an illumination surface and a non-illumination surface opposite to the illumination side. The light source is configured to inject light into the edge of the light guide. The pattern of pixels and the light guide are arranged to generate transparent illumination by the frustration of total internal reflection of light injected into the light guide such that light from the light source is emitted through the illumination surface. The antireflection coating is disposed on the illumination surface to reduce reflection of light from the pixels directed to the illumination surface.

According to one aspect according to inventive concepts disclosed herein, the pixels include a light diffusing layer and a light reflecting layer.

According to inventive concepts disclosed herein, there is provided a method of forming a one-way see-through illumination device including a light guide having an illumination surface and a non-illumination surface opposite to the illumination surface and a pattern of pixels on the non-illumination surface of the light guide. The method comprises: forming pixel wells corresponding to the pixels on the non-illumination surface; and forming the pixels using the pixel wells, wherein the pattern of pixels and the light guide are arranged to generate transparent illumination by the frustration of total internal reflection of light injected into the light guide. The pixels are arranged to prevent the generation of diffraction grating in the light guide.

According to one aspect according to inventive concepts disclosed herein, the pixels include a light diffusing layer and a light reflecting layer.

According to one aspect according to inventive concepts disclosed herein, the light diffusing layer includes titanium dioxide and an optically clear polymer.

According to one aspect according to inventive concepts disclosed herein, the pixel pattern is such that the pixels are disposed in a non-uniform manner.

According to one aspect according to inventive concepts disclosed herein, the pixel pattern is such that the pixels are disposed in a random manner.

According to one aspect according to inventive concepts disclosed herein, the method further comprises selecting a placement of the pixels of the pixel pattern such that the pixels do not overlap each other.

According to one aspect according to inventive concepts disclosed herein, the pixels have a width less than 15 microns.

According to one aspect according to inventive concepts disclosed herein, there is provided a photoresist exposure mask with transparent areas less than twenty microns in width with random locations across a surface area of a transparent substrate that has a surface area that exceeds 400 square millimeters.

According to one aspect according to inventive concepts disclosed herein, there is provided a method of generating random locations upon the photoresist exposure mask wherein locations are specified by randomly searching for available locations based upon pixel size, pixel spacing, or pixel density.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Displays are described using non-uniform or random, non-overlapping, pixel placement of micron scale pixels to deter the generation of diffraction gratings for the purpose of vision clarity. The disclosed arrangement of pixels provides for the use of invisible one-way light-emitting pixels and avoidance of diffraction gratings. The arrangement uses non-uniform or random, pixel placement, non-overlapping of micron scale pixels to deter the generation of diffraction gratings for the purpose of vision clarity.

According to another aspect of the display, optimal night usage of transparent illumination is achieved by the application of an anti-reflection coating or coatings to the illumination surface. The anti-reflection coating prevents perceptible illumination of the non-illumination surface of the transparent display. This may be achieved, for example, by a Fresnel defined mirror reflection from the illuminated surface of the transparent display.

Figure 6A:
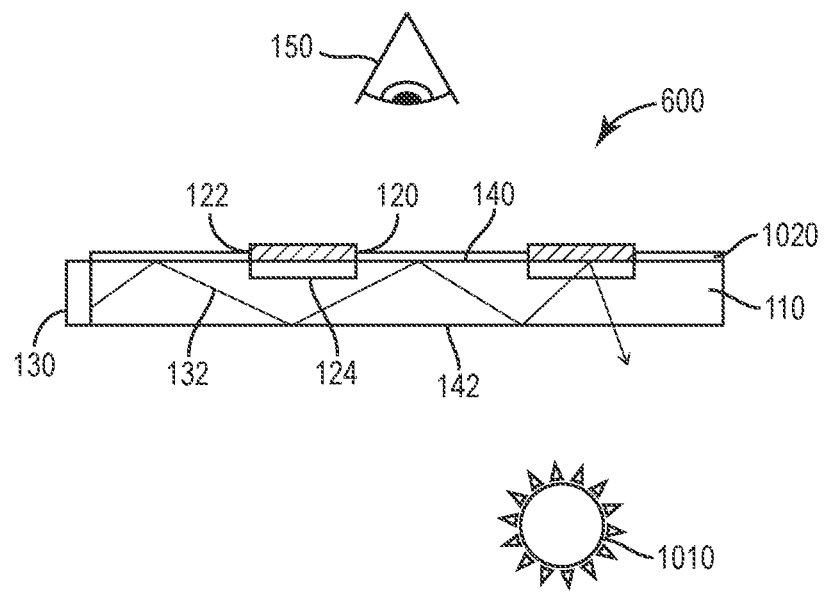
FIG. 6A is a side view illustrating a one-way see-through illumination device having a uniform arrangement of pixels.
Figure 6B:
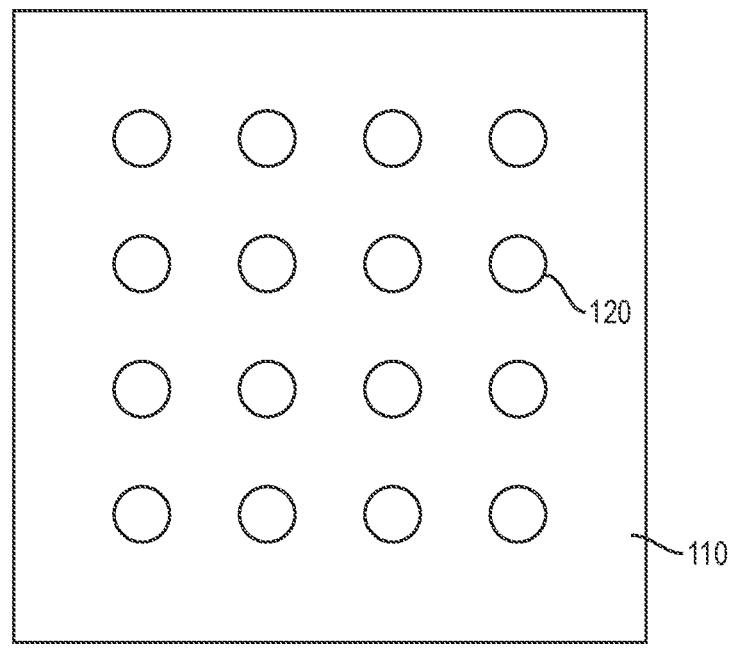
FIG. 6B is a top view of the one-way see-through illumination device of FIG. 6A.

FIG. 6A is a side view illustrating a one-way see-through illumination device 600 which may be susceptible to the generation of diffraction grating in the light guide. FIG. 6B is a top view of the one-way see-through illumination device 600 of FIG. 6A, illustrating further portions of the device 600 seen having a larger number of pixels than shown in FIG. 6A. FIG. 6A illustrates only two pixels 120 for ease of illustration. The illumination device 600 includes a light guide 110, a light source 130, and a pattern of pixels 120 on a non-illumination surface 140 of the light guide 110. Each the pattern of pixels 120 includes a light diffusing layer 124 and a light reflecting layer 122. The illumination device 100 further includes an illumination surface 142 of the light guide 110 opposite to the non-illumination surface 140.

Some of the light, but not all, originally emitted from the light source 130 is ultimately directed (by the frustration of total internal reflection by the pixel surface) to the non-illumination surface 140 and exits the illumination surface 142. On the other hand, light originally emitted from the light source 130 which does impinge on a pixel 120 is directed to the illumination surface 142, and is totally internally reflected and thus does not exit the illumination surface 142 or the non-illumination surface 140. Thus, the eye 150 of a viewer which is on the side of the illumination surface 142 is able to view light originating from the light source 130 and injected into the light guide 110. On the other hand, the eye 150 of a viewer, if the eye 150 is on the side of the non-illumination surface 140, is not able to view light originating from the light source 130 and injected into the light guide 110. Thus, the light originating from the light source 130 and injected into the light guide 110 appears to be invisible from the non-illumination surface 140.

A light ray 132 is emitted from the light source 130 and directed into the light guide 110 at an angle such that the light ray 132 impinging on the non-illumination surface 140 or illumination surface 142 undergoes total internal reflection, and the light ray 132 stays within the light guide 110. The light diffusing layer 124 is chosen to be made of a light diffusing material which has an index of refraction such that when the light ray 132 originally emitted from the light source 130 impinges on the light diffusing layer 124, total internal reflection does not occur, and the light ray 132 is transmitted into the light diffusing layer 124. The light ray 132 transmitted into the light diffusing layer 124 is diffused and impinges on the light reflecting layer 122, where the light ray 132 is reflected back into the light diffusing layer 124 and is further diffused. The reflected and diffused light from the light diffusing layer 124 then exits the light diffusing layer 124, and impacts the illumination surface 142 at less than the critical angle such that the light exits the light guide 110, and can be seen.

The one-way see-through illumination device 600 may be susceptible to the generation of diffraction grating in the light guide made up of pixels 120, and thus the illumination device 600 may be subject to the rainbow effect from white light impinging on the illumination surface 142 from outside of the device 600. For example, for an outside light source 1010, such as the sun, which provides white light impinging upon the illumination surface 142 from outside of the device 600, the uniform disposition and size of the pixels 120 provide a grating. When the sunlight passes between the pixels the white light from the sun experiences wave interference and a visible rainbow effect 1020 occurs that impedes vision from the interior (non-illuminated) side of the display 600.

The diffraction grating results from the uniform disposition and size of the pixels 120 as shown in FIGS. 6A and 6B. Thus, in order to prevent the pixels 120 from generating a diffraction grating, the pixels should be arranged in a non-uniform fashion. In this regard, the pixels may be arranged to have a non-uniform pixel width, spacing between pixels, pixel depth, pixel shape, pixel density and/or pixel placement.

Figure 1:
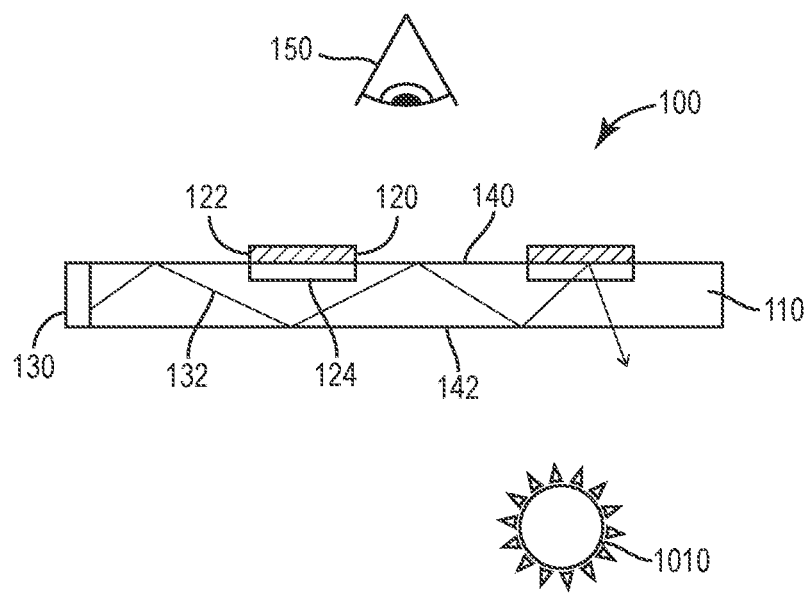
FIG. 1 is a side view illustrating a one-way see-through illumination device of an embodiment according to inventive concepts disclosed herein.
Figure 2:
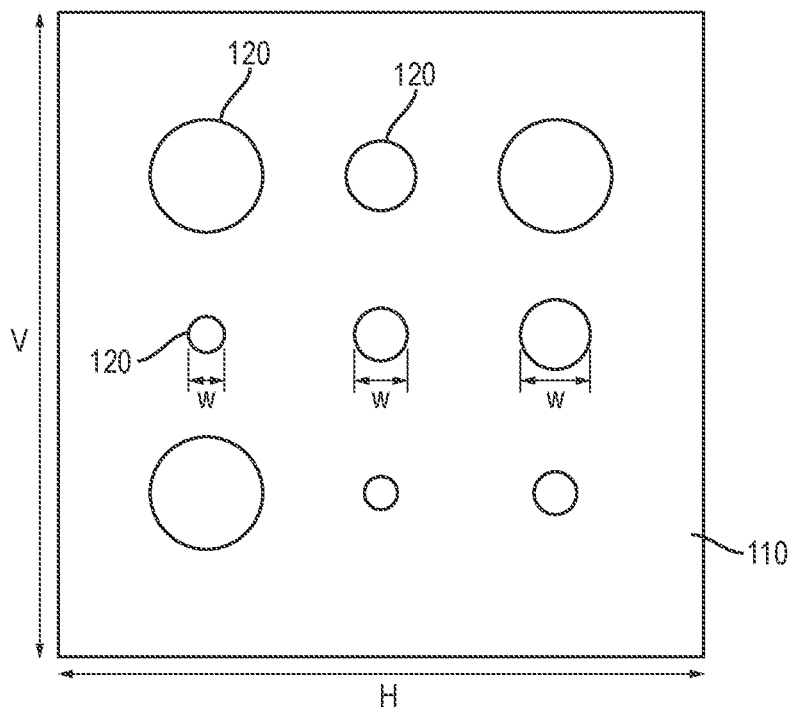
FIG. 2 is a top view illustrating a one-way see-through illumination device with a non-uniform width and size of pixels according to inventive concepts disclosed herein.

FIG. 1 is a side view illustrating a one-way see-through device 100 according to the inventive concepts disclosed herein where the pixels 120 have a non-uniform pixel arrangement. FIG. 2 illustrates a top view of the one-way see-through device 100 of FIG. 1, where a further portion of the device seen in FIG. 2 can be seen having a larger number of pixels 120 than in FIG. 1. FIG. 1 illustrates only two pixels 120 for ease of illustration. Specifically, as can be seen in FIG. 2 the spacing between pixels 120, both in the vertical V and horizontal H direction of FIG. 2, is non-uniform, and the spacing and density changes both in the vertical V and horizontal H directions in FIG. 2.

The light diffusing layer 124 of each pixel 120 may include a metal oxide within a optically clear material. For example, the light diffusing layer 124 of each pixel 120 may include titanium dioxide within an optically clear polymer.

The light reflecting layer 122 of each pixel 120 may include a reflecting material, such as a metal. For example, the light diffusing layer 124 of each pixel 120 may include a metal, such as aluminum, for example.

Methods for generating invisible one-way light-emitting pixels may include micron-scale and/or nanoscale material deposition processes including but not limited to the following processes of nanoprinting, including nanoassembly of nanoparticles in nanoimprinted wells, micromachining, such as laser cutting micron-scale features, and photolithography.

FIG. 2 illustrates a top view of the one-way see-through device 100 with a non-uniform arrangement of the pixels 120. Specifically, as can be seen in FIG. 2 the width W and size of the pixels 120, is non-uniform. The non-uniform arrangement of the pixels 120 deters the generation of diffraction gratings by the pixels 120.

Figure 3:
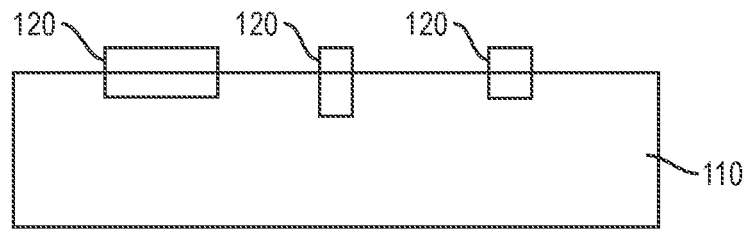
FIG. 3 is a side view illustrating a one-way see-through illumination device with a non-uniform depth of pixels according to inventive concepts disclosed herein.

FIG. 3 illustrates a side view of the one-way see-through device 100 with a non-uniform arrangement of the pixels 120. Specifically, as can be seen in FIG. 3 the depth D of the pixels 120 into the light guide 110, is non-uniform. The non-uniform arrangement of the pixels 120 deters the generation of diffraction gratings by the pixels 120.

Figure 4:
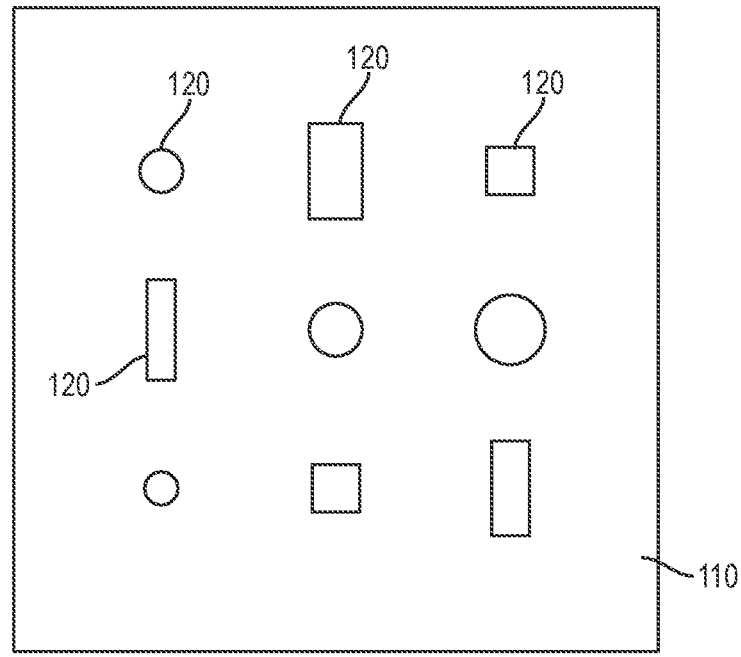
FIG. 4 is a top view illustrating a one-way see-through illumination device with a non-uniform shape of pixels according to inventive concepts disclosed herein.

FIG. 4 illustrates a top view of the one-way see-through device 100 with a non-uniform arrangement of the pixels 120. Specifically, as can be seen in FIG. 4 the shape of the pixels 120 is non-uniform. The pixels 120 may have shapes of lines, circles (dots), or polygons, for example, as see in the plane of FIG. 4. The non-uniform arrangement of the pixels 120 deters the generation of diffraction gratings by the pixels 120.

Size, depth and placement of the pixels 120 are important factors for producing "invisible" one-way see-through illumination in implementations according to the inventive concepts disclosed herein. This means in some implementations the method being deployed to render the pixels 120 may possess the resolution and placement precision to "print" light-diffusive pixels that are below 15 microns in size. For example, one desirable method is capable of capping a 2 micron wide light diffusing layer 124 with a matching light reflecting layer 122 to impart one-way light emission. In some implementations according to the inventive concepts disclosed herein, even small areas of low density traceless transparent illumination for a display may require the placement of millions of pixels in practice. For example, one square inch of a 20% halftone of two micron wide one-way light-transmitting square pixels contains more than about 32 million pixels, whereas ten micron wide pixels (at a 20 percent halftone) would have about 1.3 million pixels per square inch.

The arrangement of the pixels 120 to be non-uniform in the design of the device 100 may be accomplished through an appropriate selection of pixels 120 to be formed on the light guide 110. Methodologies are discussed further below.

In some implementations, fully transparent illumination production requires a methodology capable of producing pixel arrays that avoid the generation of diffraction gratings that impede vision. Diffraction gratings are formed by the uniform placement of pixels, which could be lines, circles (dots), or polygons that generate wave interference patterns that result in separation of composite light (white light) into its components (different colored light). To avoid this effect, when applying micron scale one-way light-emitting pixels to a surface for the purpose of fully transparent illumination, a "random" pixel pattern may be deployed when rendering the light-reflective pixel layer. In other embodiments according to the inventive concepts disclosed herein, a pixel size of less than a wavelength of light in width can be rendered that lack the sizing to cause the wave interference patterns that generate diffraction gratings.

Considerations regarding generating an effective "random" light-reflective pixel pattern to avoid the creation of a diffraction grating are as follows. A light reflecting layer 122 pattern should accurately cap a light diffusing layer 124 pattern. Thus, the coordinates of any randomized light reflecting layer 122 pattern should be known, so the related underlying light diffusing layer 124 pattern can be generated. In implementations according to inventive concepts disclosed herein, both the light reflecting layer 122 pattern and the light diffusing layer 124 pattern are produced using microlithography printing plates. Such microlithography printing plates may be formed using customizable microlithography CAD applications, such as used within the semiconductor industry.

Regarding pixel 120 pattern specification, current semiconductor CAD software repeats geometries by "stepping" a pattern across a wafer surface. To generate random pixel locations that prohibit diffraction gratings repeated patterns should be avoided. Accordingly, according to disclosed embodiments of the inventive concepts disclosed herein, random pixel locations may be assigned across the entire surface area of a display (device) by specifying the parameters of pixel 120 width. After specifications are inputted, a random number generator is used to test for the availability of spaces of the display (device) surface until an entire pattern is formed.

In some embodiments according to the inventive concepts disclosed herein, the optimum pixel pattern of the pixels is generated by the random placement of pixels 120 with no overlap. Further, the light reflecting layer 122 of each pixel 120 may be slightly wider than the underlying light diffusing layer 124 for the pixel.

Figure 5:
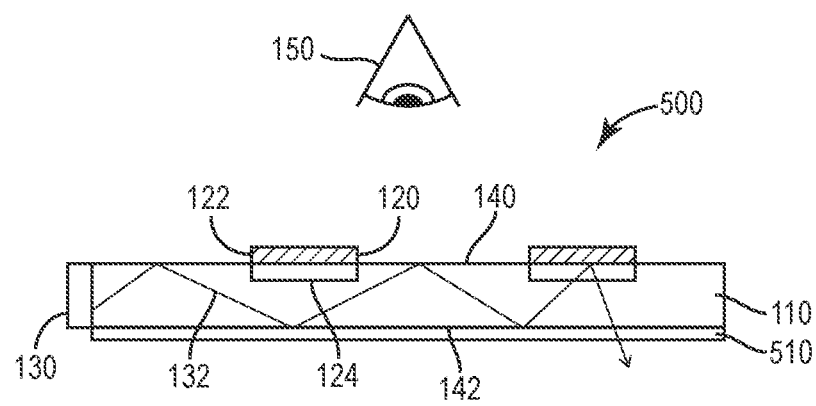
FIG. 5 is a side view illustrating a one-way see-through illumination device having an antireflection coating on the illumination surface according to inventive concepts disclosed herein.

The illumination surface 142 of the light guide 110 may be coated with an anti-reflection coating whose composition and thickness is optimized to prohibit the reflection of the selected illumination color. FIG. 5 illustrates a side view of a one-way see-through illumination device 500 according to the inventive concepts disclosed herein having an antireflection coating 510 disposed on the illumination surface 142 to reduce reflection of light from the pixels 120 directed to the illumination surface 142. The device 500 of FIG. 5 is similar to that of FIG. 1A, except for the addition of the antireflection coating 510. The antireflection coating 510 may be optimized for a specific wavelength of light or address reflection across a broad spectrum. The antireflection coating 510 improves night operation of the display by limiting light emission from the non-illuminated side of the display, for example a 3% light reflection rate can be lowered to less than 1%.

The embodiments of the inventive concepts disclosed herein have been described in detail with particular reference to preferred embodiments thereof, but it will be understood by those skilled in the art that variations and modifications can be effected within the spirit and scope of the inventive concepts.

Embodiments of the inventive concepts disclosed herein have been described with reference to drawings. The drawings illustrate certain details of specific embodiments that implement systems and methods of the present disclosure. However, describing the embodiments with drawings should not be construed as imposing any limitations that may be present in the drawings.

The foregoing description of embodiments has been presented for the purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments with various modification as are suited to the particular use contemplated. Other substitutions, modifications, changes and omissions may be made in the design, operating conditions and arrangement of the embodiments without departing from the scope of the presently disclosed subject matter.

What is claimed is:

1. A one-way see-through illumination device, comprising:
    a light guide having an illumination surface and a non-illumination surface opposite to the illumination surface;
    a light source at an edge of the light guide, and configured to inject light into the edge of the light guide; and
    a pattern of pixels disposed on a surface of the light guide in a non-uniform arrangement, wherein the pattern of pixels and the light guide are arranged to generate transparent illumination by frustration of total internal reflection of light injected into the light guide such that light from the light source is emitted through the illumination surface,
    wherein the pixels include a light diffusing layer and a light reflecting layer, and are arranged to prevent generation of a diffraction grating in the light guide.

2. The one-way see-through illumination device of claim 1, wherein the pixels have a width less than one micron.

3. The one-way see-through illumination device of claim 1, wherein the pattern of pixels comprises a maximum pixel width of less than 15 microns.

4. The one-way see-through illumination device of claim 1, wherein the pixels have a width less than one micron.

5. The one-way see-through illumination device of claim 1, wherein the pixels have various different widths.

6. The one-way see-through illumination device of claim 1, wherein the pixels have various different depths.

7. The one-way see-through illumination device of claim 1, wherein the pixels have various spacings between pixels.

8. The one-way see-through illumination device of claim 1, wherein the pixels have various pixel shapes.

9. The one-way see-through illumination device of claim 1, wherein the pixels have various pixel densities.

10. A one-way see-through illumination device, comprising
    a light guide having an illumination surface and a non-illumination surface opposite to the illumination surface;
    a light source at an edge of the light guide, and configured to inject light into the edge of the light guide;
    a pattern of pixels disposed on a surface of the light guide in a non-uniform arrangement, wherein the pattern of pixels and the light guide are arranged to generate transparent illumination by frustration of total internal reflection of light injected into the light guide such that light from the light source is emitted through the illumination surface, and wherein the pixels include a light diffusing layer and a light reflecting layer; and
    an antireflection coating disposed on the illumination surface to reduce reflection of light from the pixels directed to the illumination surface.

* * * * *